United States Patent
Murphy

(10) Patent No.: US 7,047,228 B1
(45) Date of Patent: May 16, 2006

(54) ENGINEERING PROCESS FOR PROCURING COMPONENTS/PERIPHERALS

(75) Inventor: Paul J. Murphy, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/420,696

(22) Filed: Oct. 19, 1999

(51) Int. Cl.
*G06F 17/30* (2006.01)

(52) U.S. Cl. ............................ 707/1; 707/200; 700/182; 717/100

(58) Field of Classification Search ............... 707/1–10, 707/100–104.1, 200–206; 705/9, 28, 29; 700/97–98, 106–107, 103–104, 117, 182; 790/213–219; 717/100, 103
See application file for complete search history.

(56) References Cited

U.S. PATENT DOCUMENTS

| | | | | |
|---|---|---|---|---|
| 5,552,995 A | * | 9/1996 | Sebastian | 700/97 |
| 5,777,876 A | * | 7/1998 | Beauchesne | 700/95 |
| 5,822,206 A | * | 10/1998 | Sebastian et al. | 700/97 |
| 5,822,207 A | * | 10/1998 | Hazama et al. | 700/97 |
| 5,864,875 A | * | 1/1999 | Van Huben et al. | 707/200 |
| RE36,602 E | * | 3/2000 | Sebastian et al. | 700/97 |
| 6,044,369 A | * | 3/2000 | Black | 707/104.1 |
| 6,182,275 B1 | * | 1/2001 | Beelitz et al. | 717/175 |

\* cited by examiner

*Primary Examiner*—Shahid Alam
*Assistant Examiner*—Jean Bolte Fleurantin
(74) *Attorney, Agent, or Firm*—Hamilton & Terrile, LLP; Stephen A. Terrile

(57) ABSTRACT

A system and method of component procurement efficiently provides a centralized location for storing and retrieving component data. The engineering method is for procuring a manufactured component through a plurality of development stages. According to one embodiment, the method includes providing a database for storing information related to procuring the manufactured component, sharing the database among a plurality of relevant parties such as a manufacturer and a supplier and inputting data into the database by at least one of the relevant parties during a development stage of the manufactured component. The method also includes modifying the database at each development stage if necessary. The database holds data related to procurement of components for a computer system and is accessible to a manufacturer and at least one outside vendor. The database includes a pointer for locating data related to at least one of the development stages. The data in the database includes procurement-related data such as production information, testing information, regulatory information, and cost information. The database is stored on a memory and includes a plurality of partitions, each partition relating to manufacturing the component. The database also includes a plurality of fields within each partition, the plurality of fields for logging information related to a plurality of manufacturing development stages. The database also includes a plurality of storage locations for storing data related to the plurality of partitions.

36 Claims, 23 Drawing Sheets

*Figure 4A*

POWER SUPPLY QUALIFICATION CHECKLIST
Supplier Model: 430          Dell Part Number: 440
Target Product(s):           Dell Engineer: 450
                             Supplier Engineer: 460

ITEM     PROTOTYPE STAGE   DVTSTAGE   DVT3STAGE   PRODUCTION RELEASE

420

I.    Electrical (RTE & Bench):
II.   Mechanical:
III.  Design Reviews:
IV.   Manufacturability:
V.    Regulatory:
VI.   Reliability:
VII.  System Test:
VIII. Packaging:
IX.   Documentation:

ENGINEERING PROCESS FOR PROCURING COMPONENTS/PERIPHERALS

BACKGROUND OF THE INVENTION

This invention relates in general to procurement of computer components and more particularly to a database, system and method for procuring computer components.

DESCRIPTION OF THE RELATED ART

Computer systems in general and IBM compatible personal computer systems in particular have attained widespread use for providing computing power to many segments of society. Computer systems, servers and mass storage devices can usually be defined as desk-top, floor-standing, rack-mount, or portable microcomputers that include a system unit having a system processor and associated volatile and non-volatile memory, a display monitor, a keyboard, one or more diskette drives, a fixed disk storage device, optional printer and optional scanners.

The computer companies such as Dell Computer Corporation typically manufacture and test components for use in a computer system using outside manufacturers and on-site engineers. Engineers develop specifications for components and an iterative process begins. The process typically includes developing a prototype of a component, and transferring the component between those involved in the process, such as the manufacturer and engineers. The process also involves functionality testing and safety testing before finalizing a version of a component for implementation into a computer system.

Generally, a number of engineers and outside vendor companies assist in the development and procurement of a component. At each stage of the process, those involved transfer and receive a large amount of data. Outside manufactures typically have numerous departments, each department having a different functional role with regard to the development of a component. Similarly, a computer company with on-site engineers also has a number of departments involved in developing a component. As a result of the many departments involved in component procurement both in and outside of a computer company, the data produced during development is often scattered among several locations. The data typically includes oscilloscope wave forms, electrical and/or mechanical drawings, test results, safety requirements and more. An engineer in a testing department may keep the data related to testing; an engineer in a prototype development department may have the specifications and electrical drawings; and a safety coordinator may keep data related to regulatory requirements. Often the data will be transferred on an as-needed basis between company engineers and outside manufacturers. For example, a design engineer may require documentation related to test results before modifying a prototype.

When a need for data arises, typical problems encountered include locating the data, retrieving the data, and storing the data. Data that is shared between engineers and consultants and manufacturers may be hard to locate. If data is located off-site, a typical problem relates to the file format of the data. For example, an off-site manufacturer may use an incompatible software program for storing data, requiring either a purchase of software or locating a seldom-used program within the company. If software formatting of data is difficult, facsimile transmissions often prove inadequate depending on the level of detail of the data. After an engineer reviews data received from an off-site manufacturer, an engineer typically stores the data. However, a typical problem relates to where the data should be stored and in what format. If the data is stored in the format provided by an off-site manufacturer, it may be irretrievable. If the data is stored as a hard copy, the data may unnecessarily use valuable storage space.

What is needed is a system and method of procuring components that enables manufacturers and engineers to efficiently locate and utilize relevant data.

SUMMARY OF THE INVENTION

Accordingly, a system and method of component procurement efficiently provides a centralized location for storing and retrieving component data. The engineering method is for procuring a manufactured component through a plurality of development stages. According to one embodiment, the method includes providing a database for storing information related to procuring the manufactured component, sharing the database among a plurality of relevant parties such as a manufacturer and a supplier and inputting data into the database by at least one of the relevant parties during a development stage of the manufactured component. The method also may include modifying the database at each development stage.

The database holds data related to procurement of components for a computer system and is accessible to a manufacturer and at least one outside vendor. The database includes a pointer for locating data related to at least one of the development stages. The data in the database includes procurement-related data such as production information, testing information, regulatory information, and cost information. More specifically, the database is stored on a memory and includes a plurality of partitions, each partition relating to manufacturing the component. The database also includes a plurality of fields within each partition, the plurality of fields for logging information related to a plurality of manufacturing development stages. The database also includes a plurality of storage locations for storing data related to the plurality of partitions.

BRIEF DESCRIPTION OF THE DRAWINGS

The present invention may be better understood, and its numerous objects, features, and advantages made apparent to those skilled in the art by referencing the accompanying drawings.

FIGS. 4A & 4B are screen prints from a database according to an embodiment of the present invention showing a list of checklists.

FIGS. 7A & 7B are screen prints from a database showing a mechanical evaluation form according to an embodiment of the present invention.

FIGS. 12A & 12B are screen prints from a database showing a system test form and a packaging form according to an embodiment of the present invention.

The use of the same reference symbols in different drawings indicates similar or identical items.

DESCRIPTION OF THE PREFERRED EMBODIMENT(S)

Figure 1:
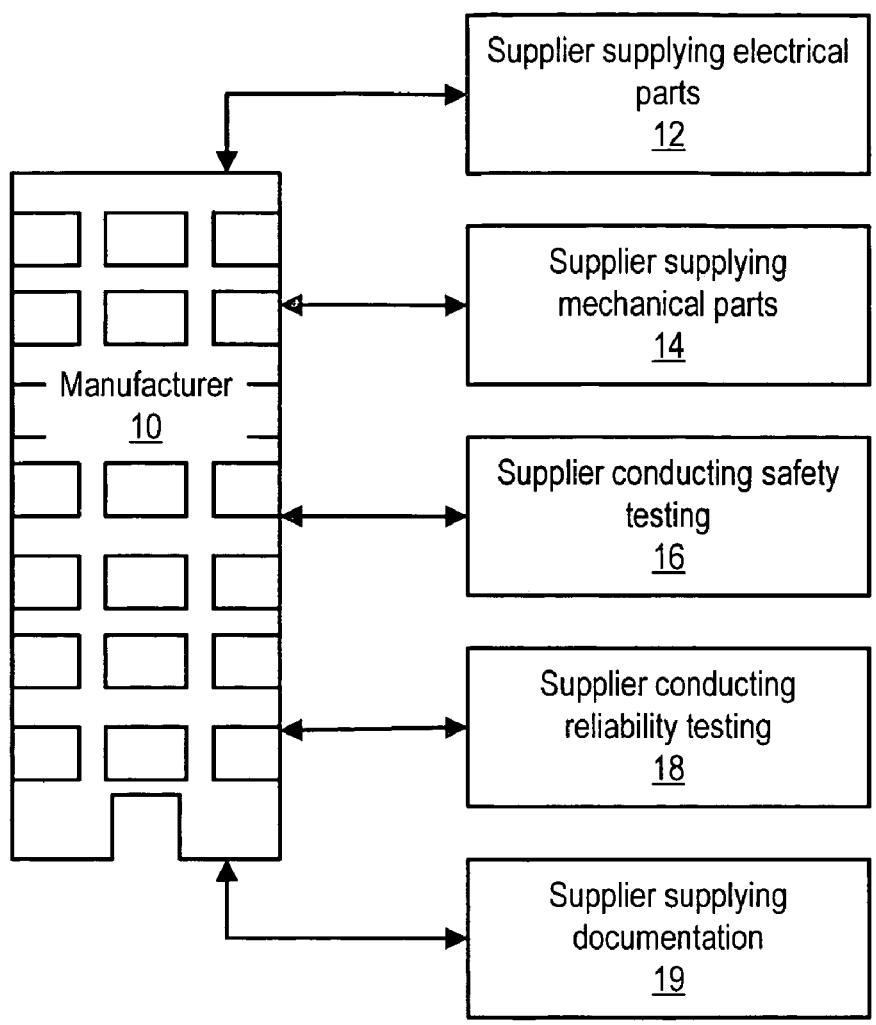
FIG. 1 is a block diagram illustrating a procurement process.

Referring to FIG. 1, the manufacturing of a computer system involves a number of engineers and outside vendor companies 12, 14, 16, 18 and 19 to assist in the development and procurement of components used in the computer system. At each stage of the process for each component, the vendors and the manufacturer 10 transfer and receive a large amount of data. For example, a vendor supplying electrical parts 12 will have electrical drawings and schematics; a vendor supplying mechanical parts 14 will have mechanical drawings, some of which may or may not be in digital format.

Figure 2:
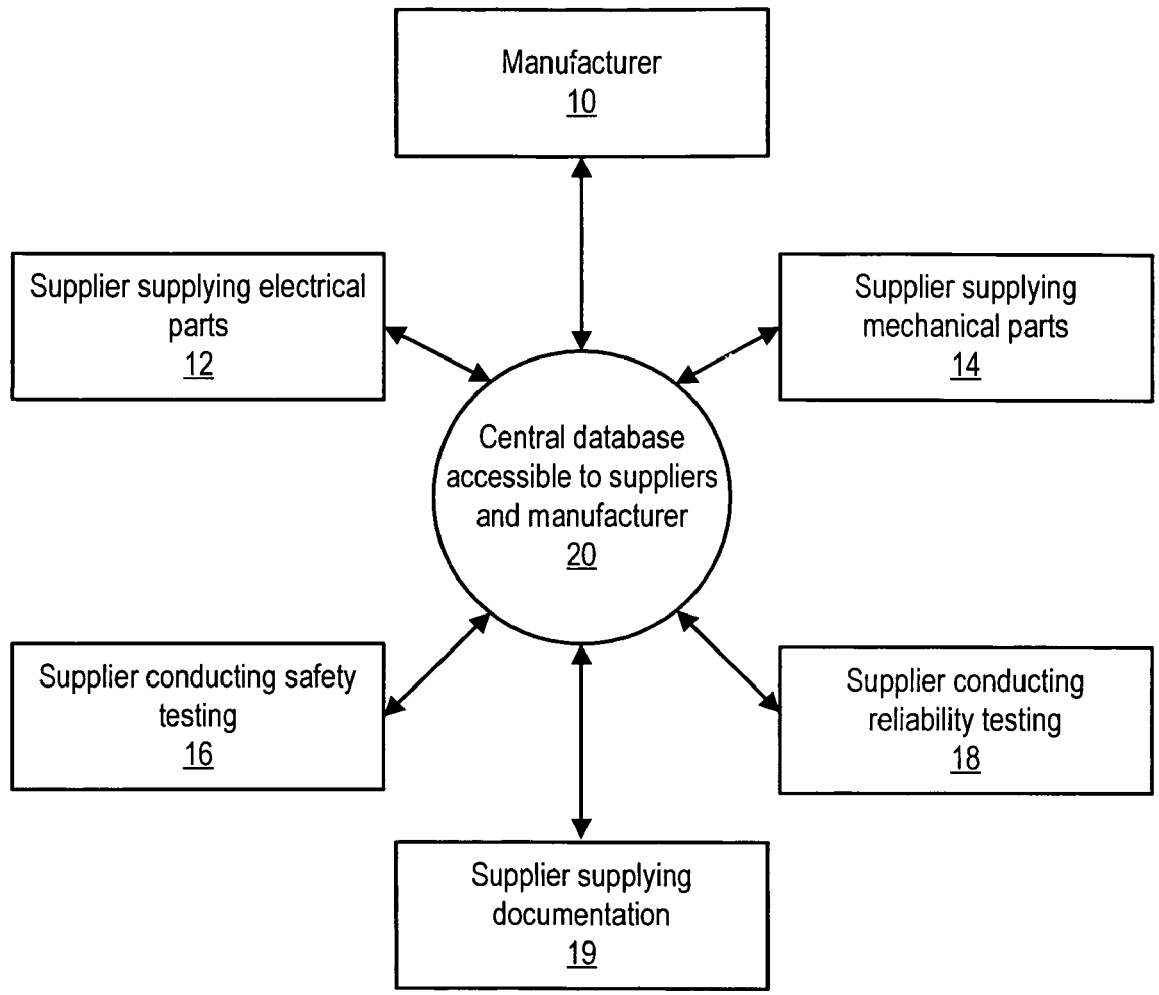
FIG. 2 is a block diagram representing an embodiment of a database in accordance with the present invention.

According to an embodiment of the present invention, the procurement process illustrated in FIG. 1 is greatly enhanced by the use of a shared database. Referring to FIG. 2, each of the vendors and the manufacturer 10 share a common database for each peripheral, computer component, or project. According to another embodiment, a shared database includes databases for different components of a computer system. Instead of transferring paper copies, floppy discs, data books and other easily lost items of data, database 20 includes all necessary information. For example, the database 20 may store oscilloscope wave forms, electrical and mechanical drawings, automatic test equipment data, word processor files, spreadsheet files and images.

The database efficiently can be stored on a memory. For example, the database is adaptable for storage on a compact disc that is transferred between manufacturer 10 and the different suppliers 12, 14, 16, 18, 19. Alternatively, the database can be accessed via a secured network such as a secured website.

Figure 3:
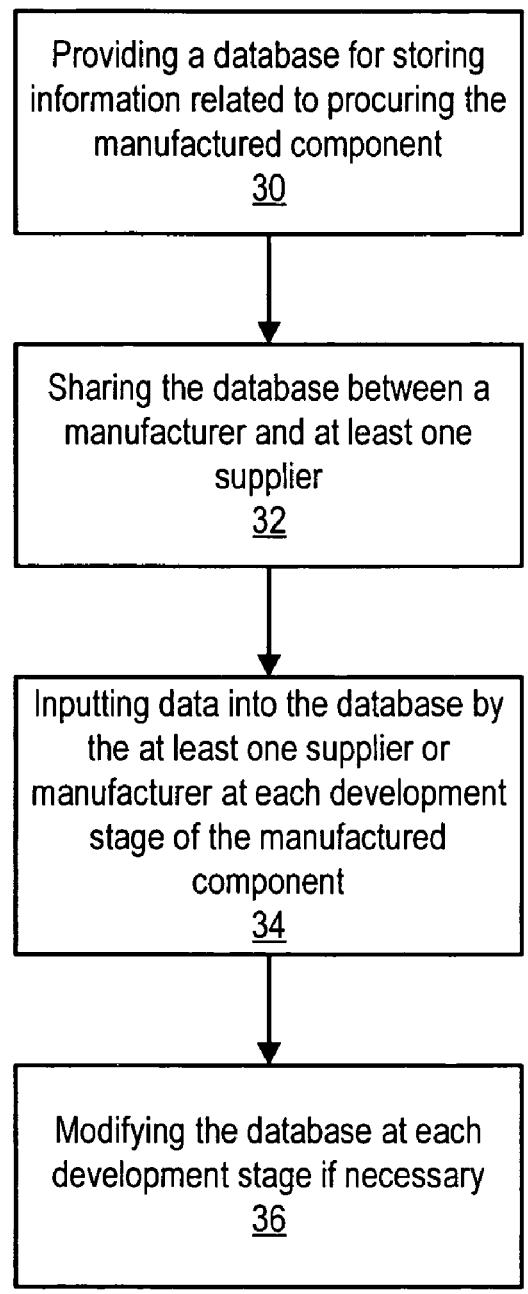
FIG. 3 is a flow diagram representing a procurement process using a database in accordance with an embodiment of the present invention.
Figure 5A:
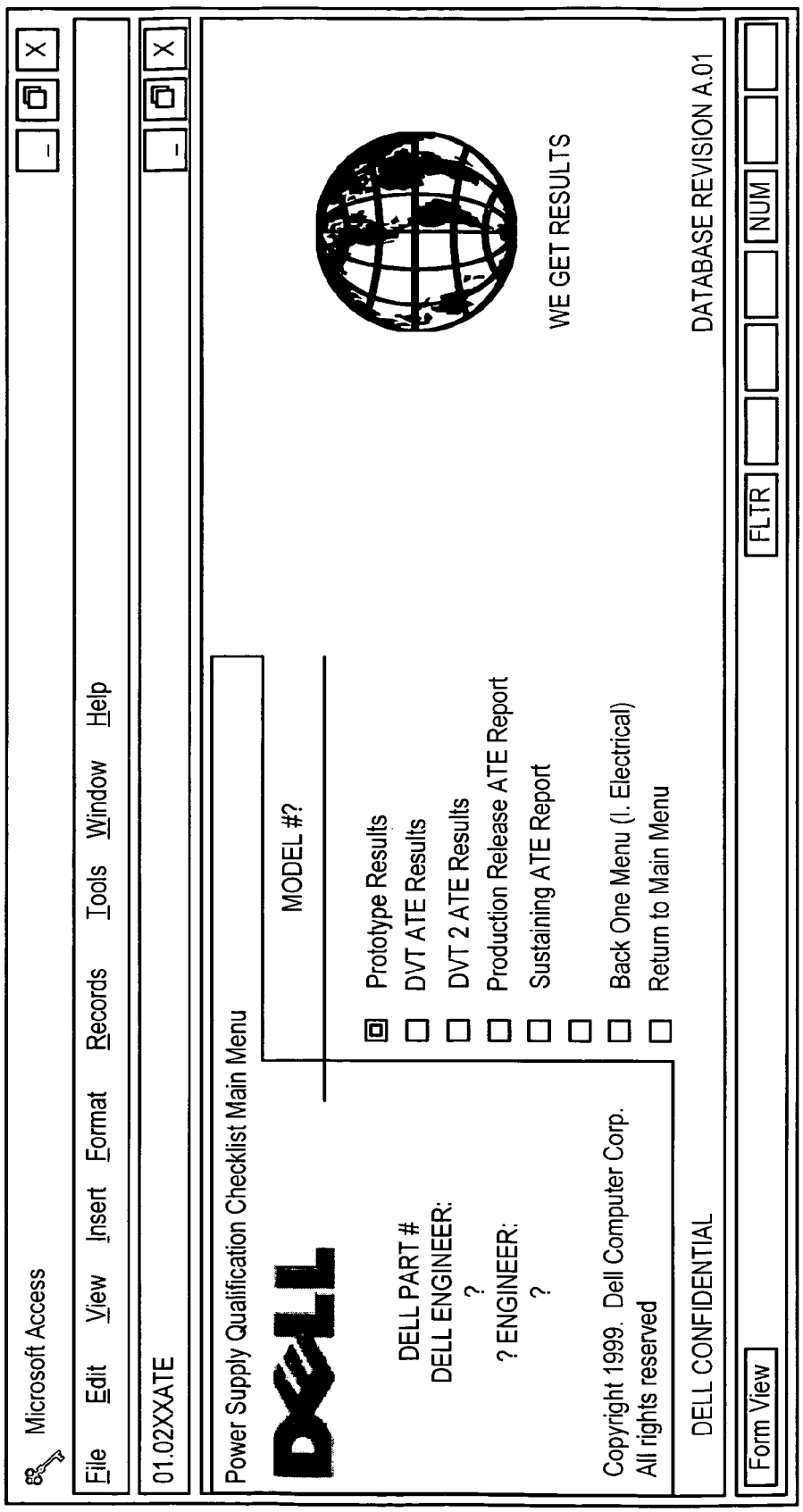
FIGS. 5A & 5B are screen prints from a database showing an electrical evaluation form according to an embodiment of the present invention.
Figure 5B:
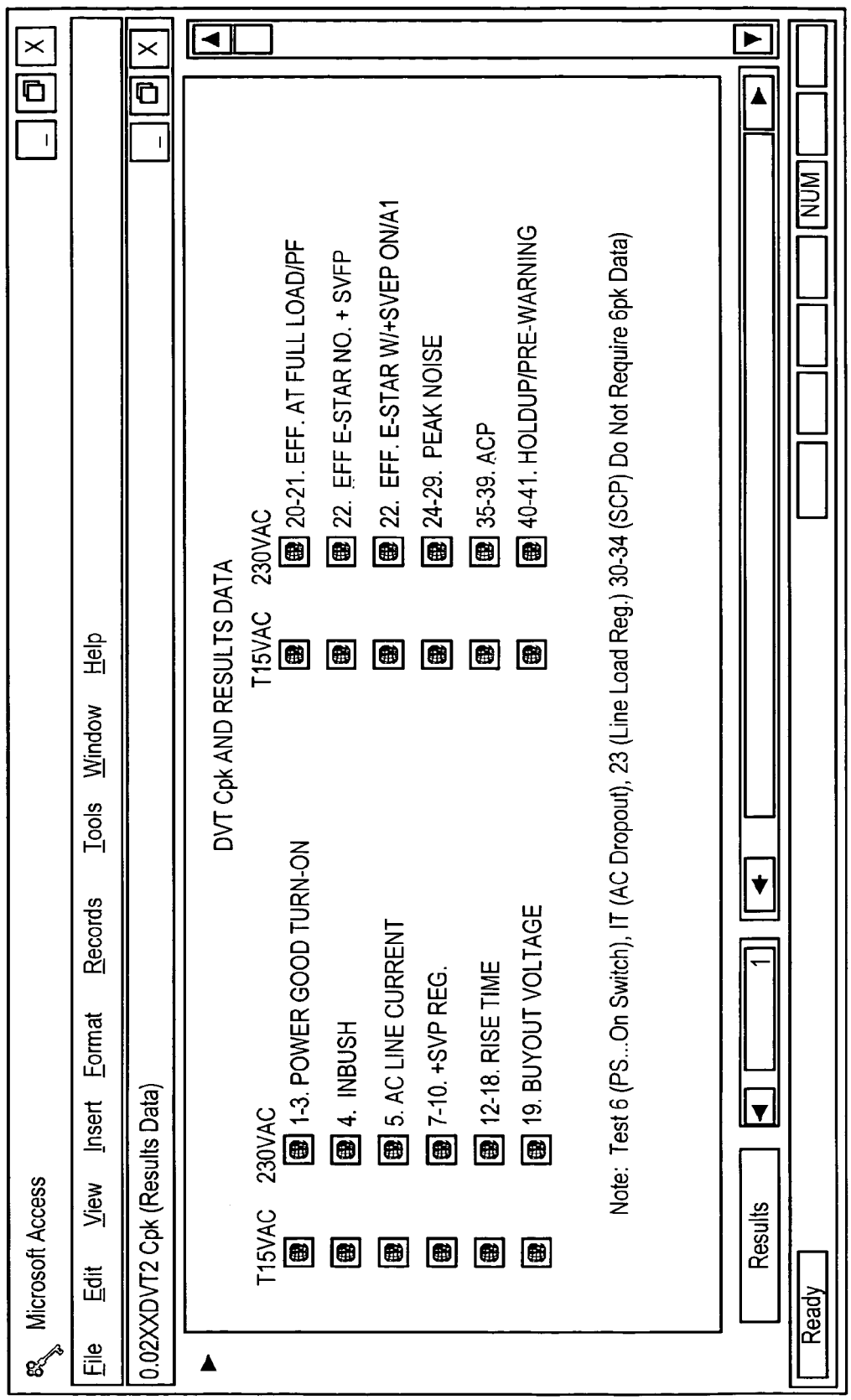

Referring to FIG. 3, a method for procuring a manufactured component through a plurality of development stages is shown. The Figure shows step 30, which relates to providing a database for storing information related to procuring the manufactured component. Step 32 relates to sharing the database among a plurality of relevant parties. The sharing includes placing the database in an accessible internet/intranet network and placing the database on a compact disc that is physically transported among relevant parties. Step 34 relates to inputting data into the database by at least one of the relevant parties during a development stage of the manufactured component. One of ordinary skill in the art will appreciate that the inputting of data into the database may be done by suppliers, engineers for the manufacturer or other relevant parties. Step 36 relates to modifying the database at each development stage if necessary. It will be appreciated that modifying the database may not be necessary at all development stages. For example, if a prototype meets specifications, further development changes may or may not be necessary.

Figure 6A:
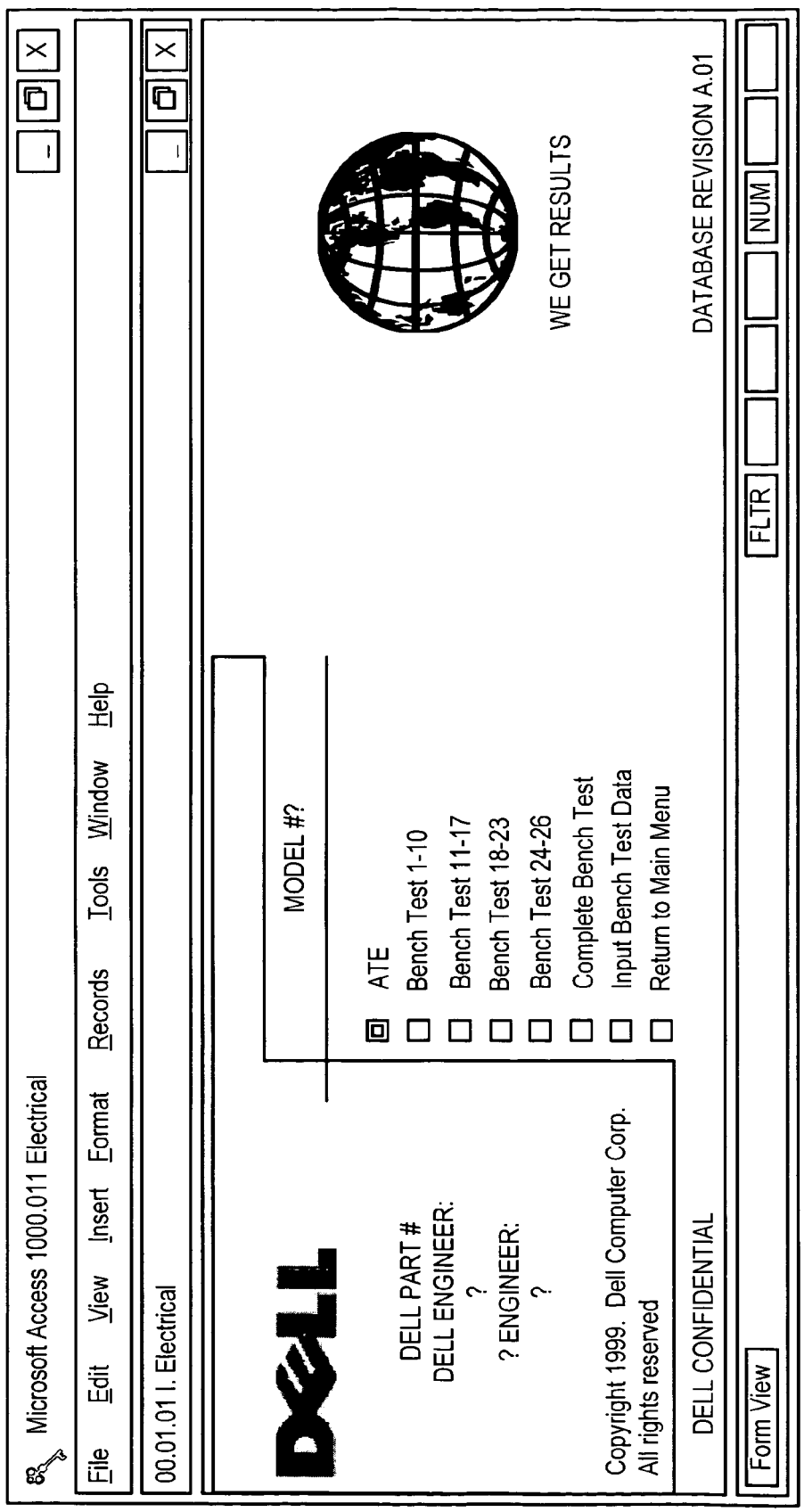
FIGS. 6A & 6B are screen prints from a database showing an electrical evaluation form including bench testing according to an embodiment of the present invention.
Figure 6B:
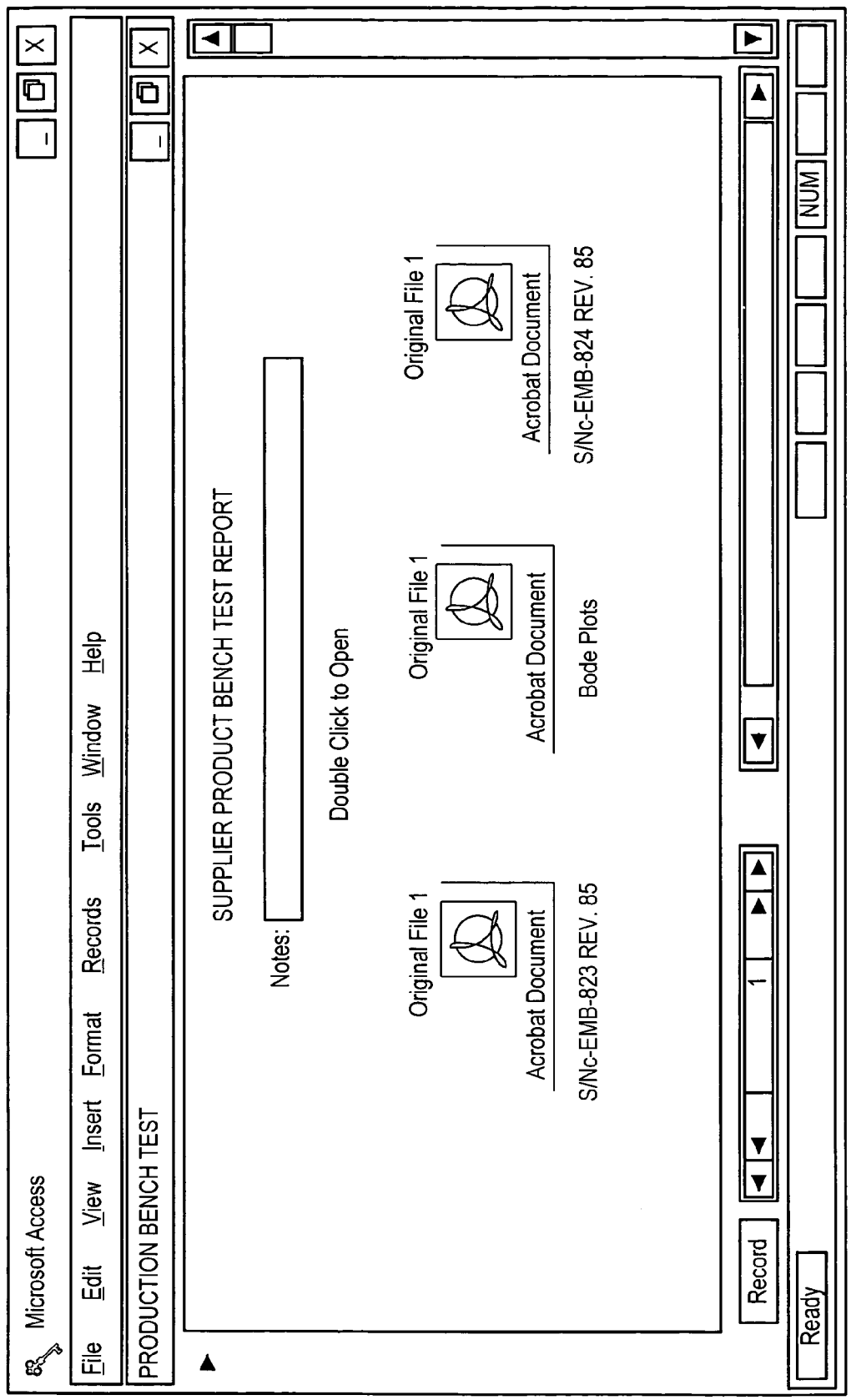
Figure 7A:
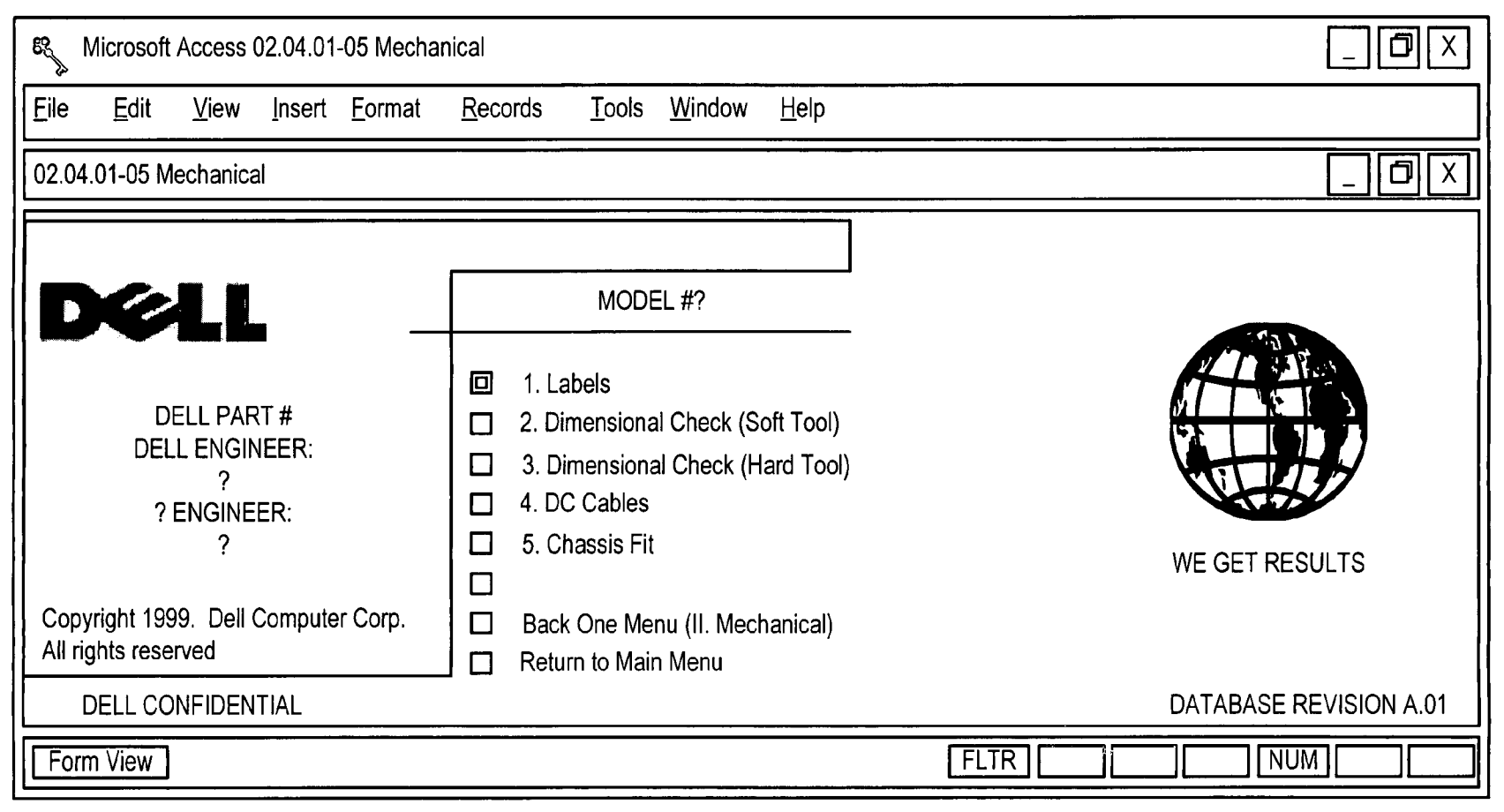
Figure 7B:
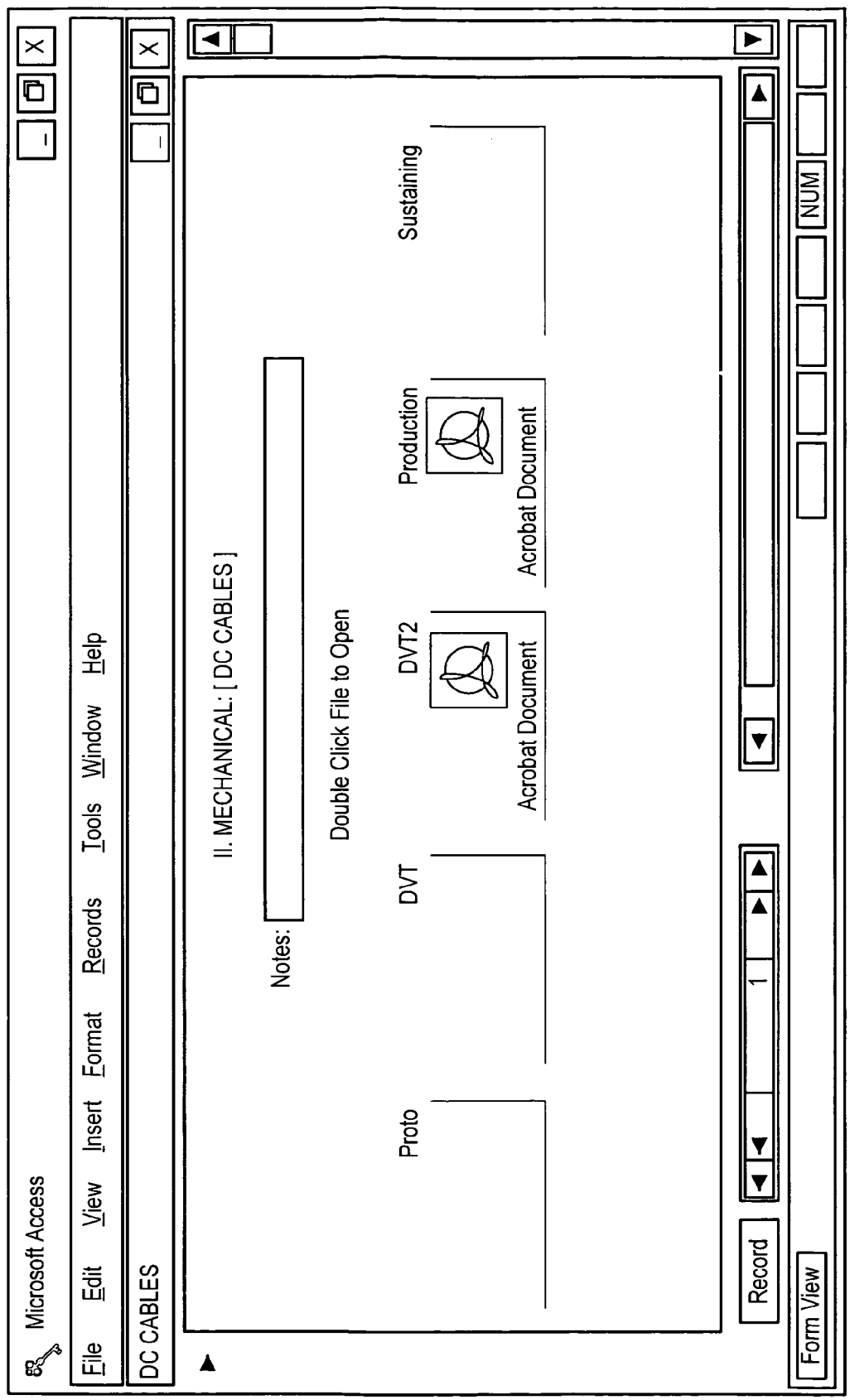
Figure 8A:
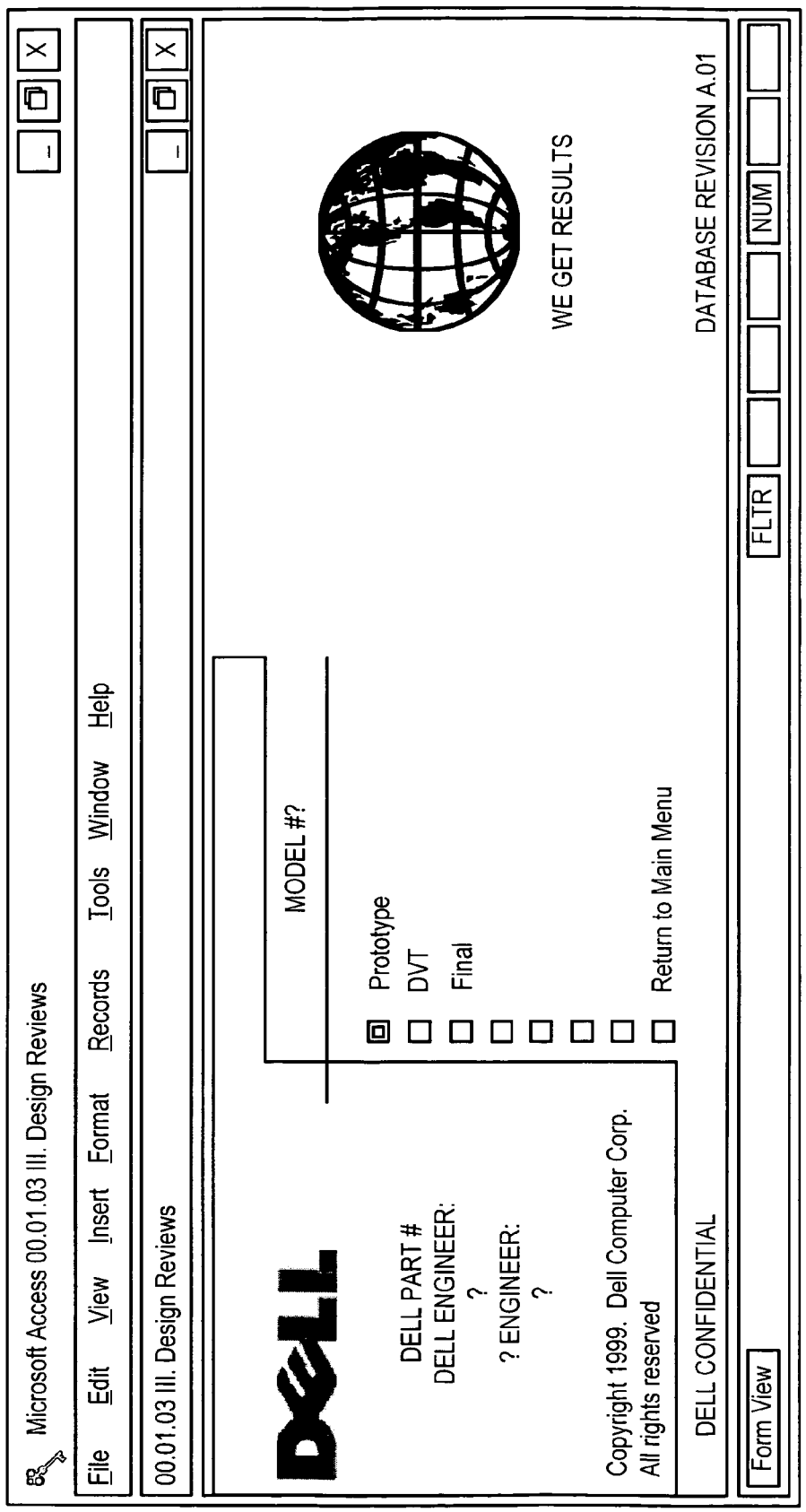
FIGS. 8A & 8B are screen prints from a database showing a design review form according to an embodiment of the present invention.
Figure 8B:
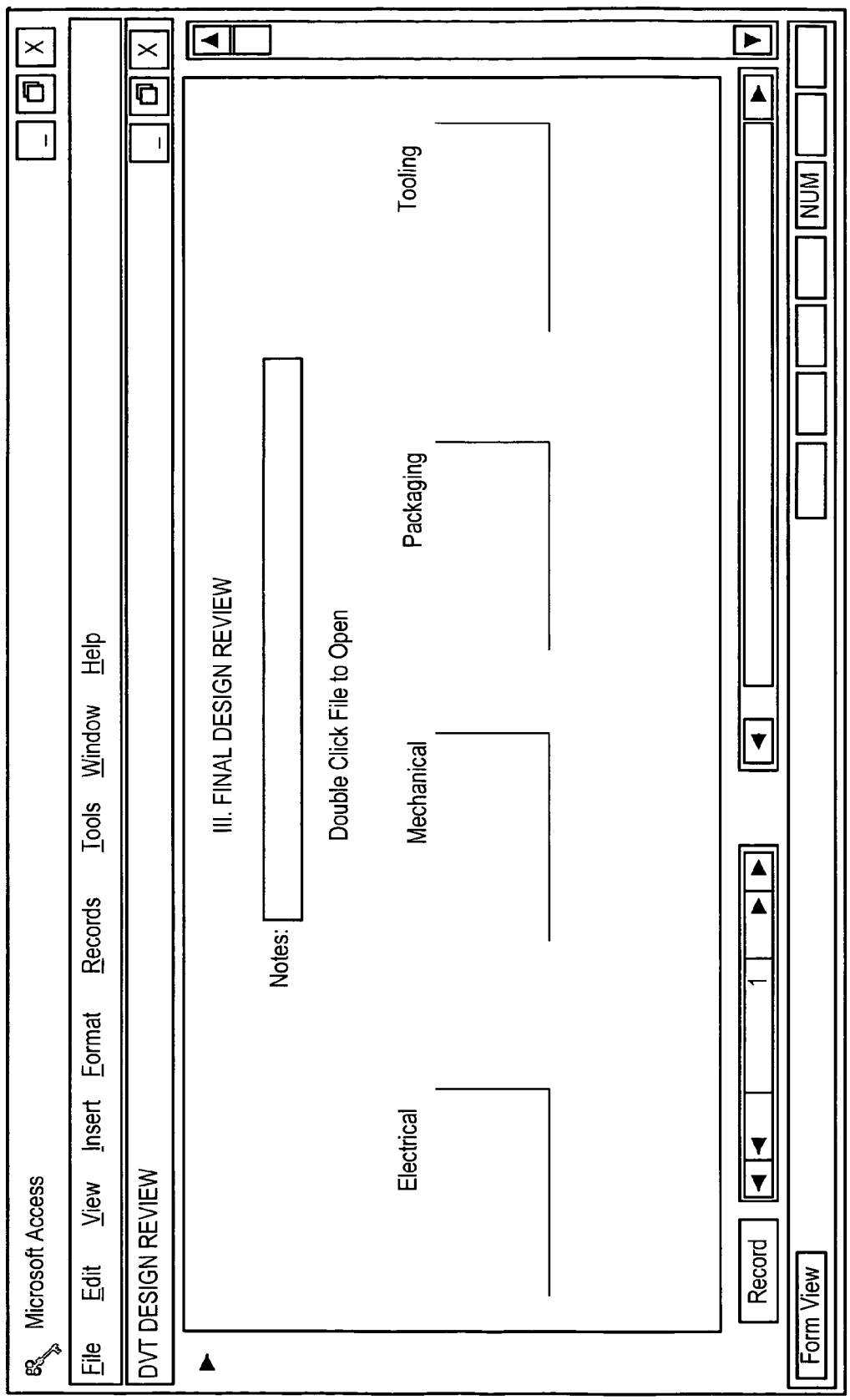
Figure 9A:
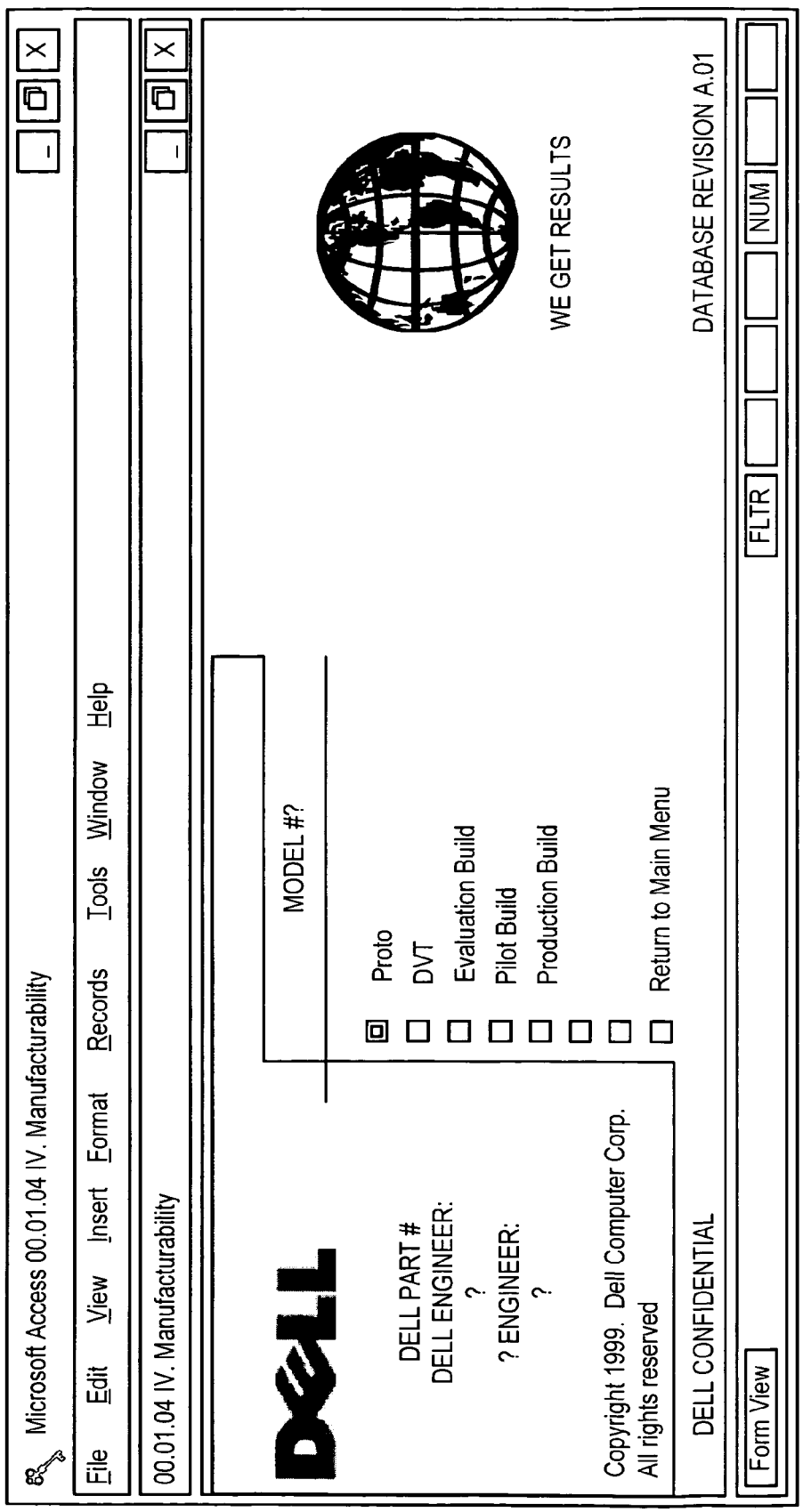
FIGS. 9A & 9B are screen prints from a database showing a manufacturability form including an evaluation build form, a pilot build form and a production build form according to an embodiment of the present invention.
Figure 9B:
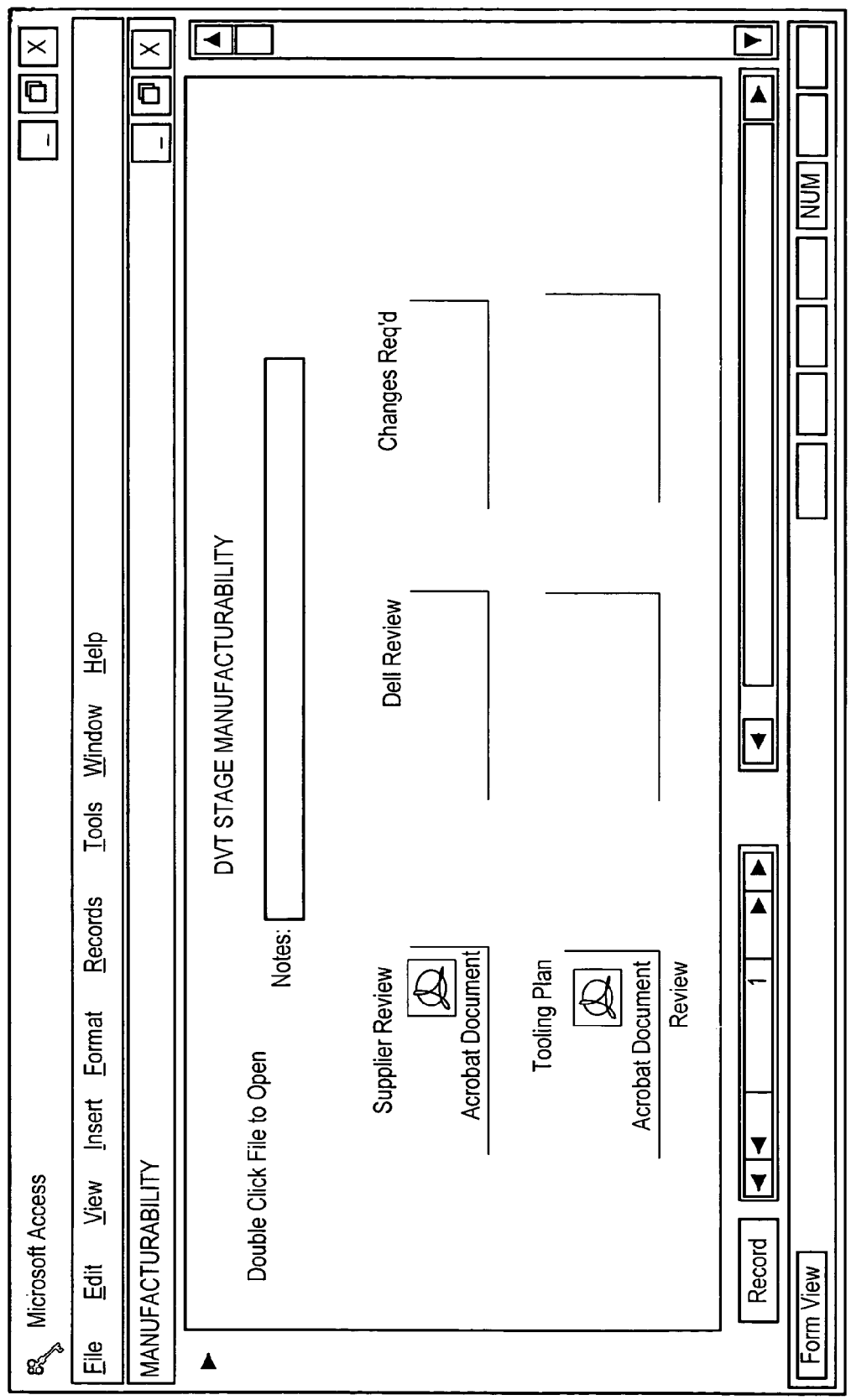
Figure 10A:
FIGS. 10A & 10B are screen prints from a database showing a regulatory form according to an embodiment of the present invention.
Figure 10B:
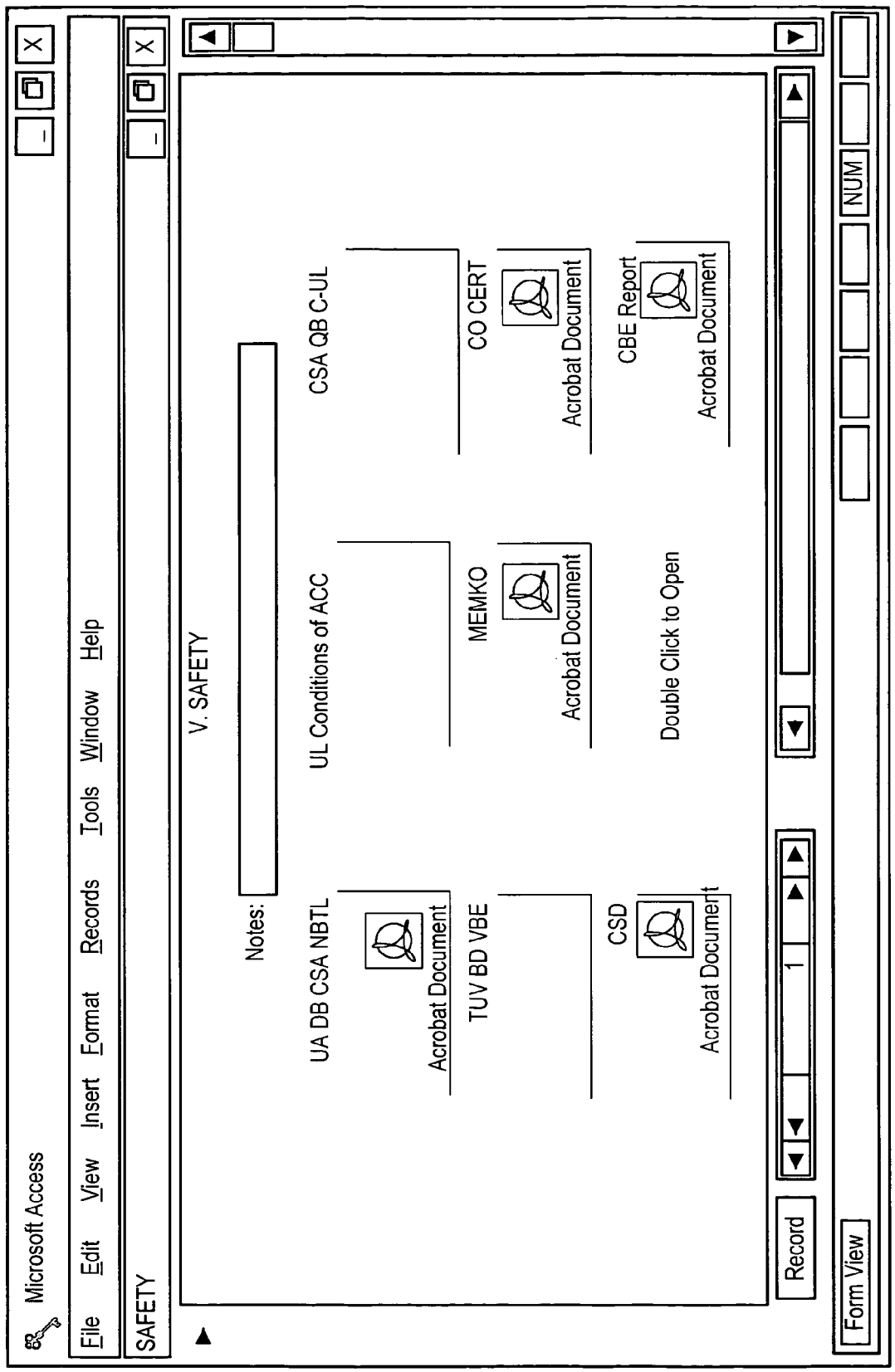
Figure 11A:
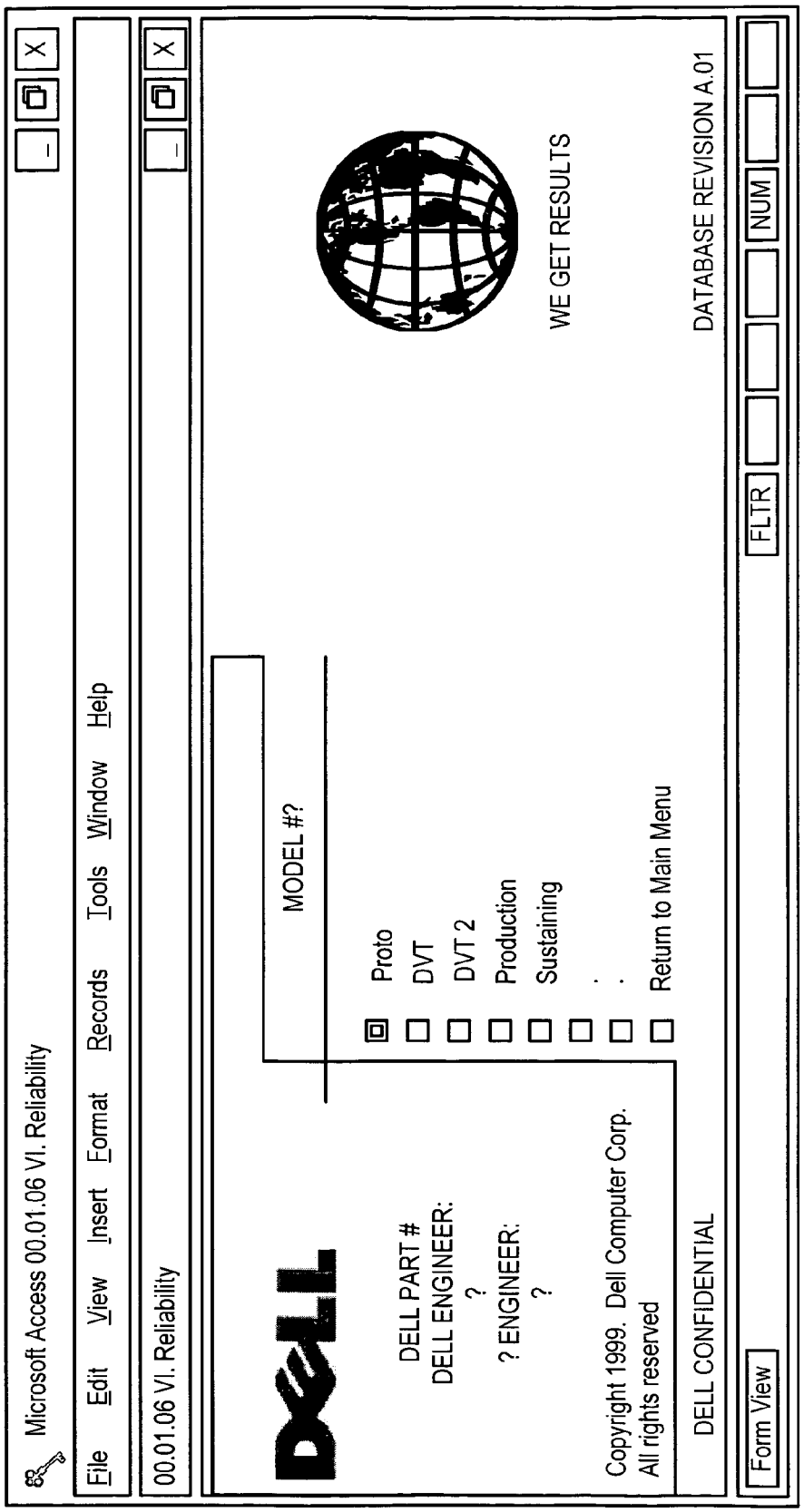
FIGS. 11A & 11B are screen prints from a database showing a reliability form according to an embodiment of the present invention.
Figure 11B:
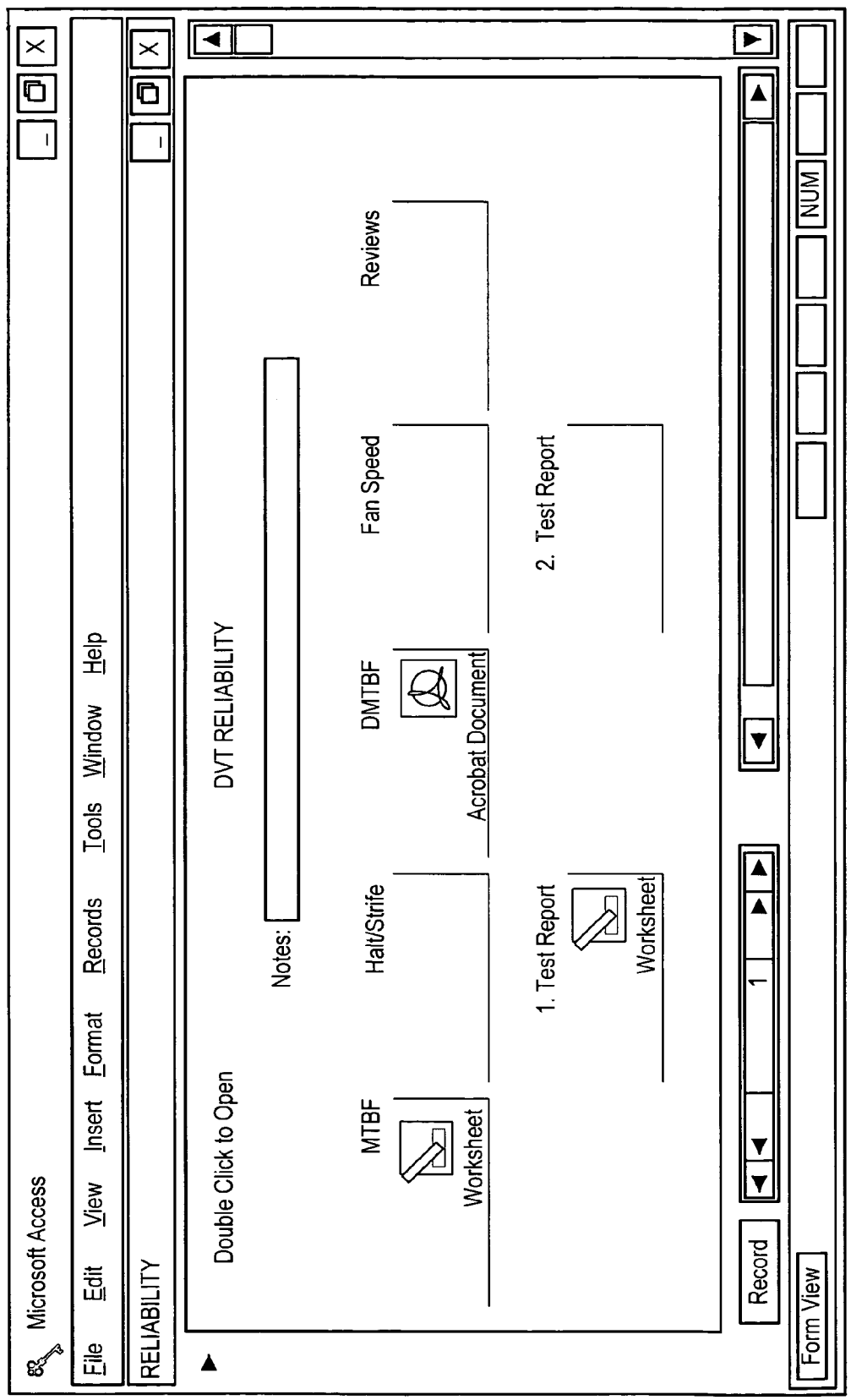
Figure 12A:
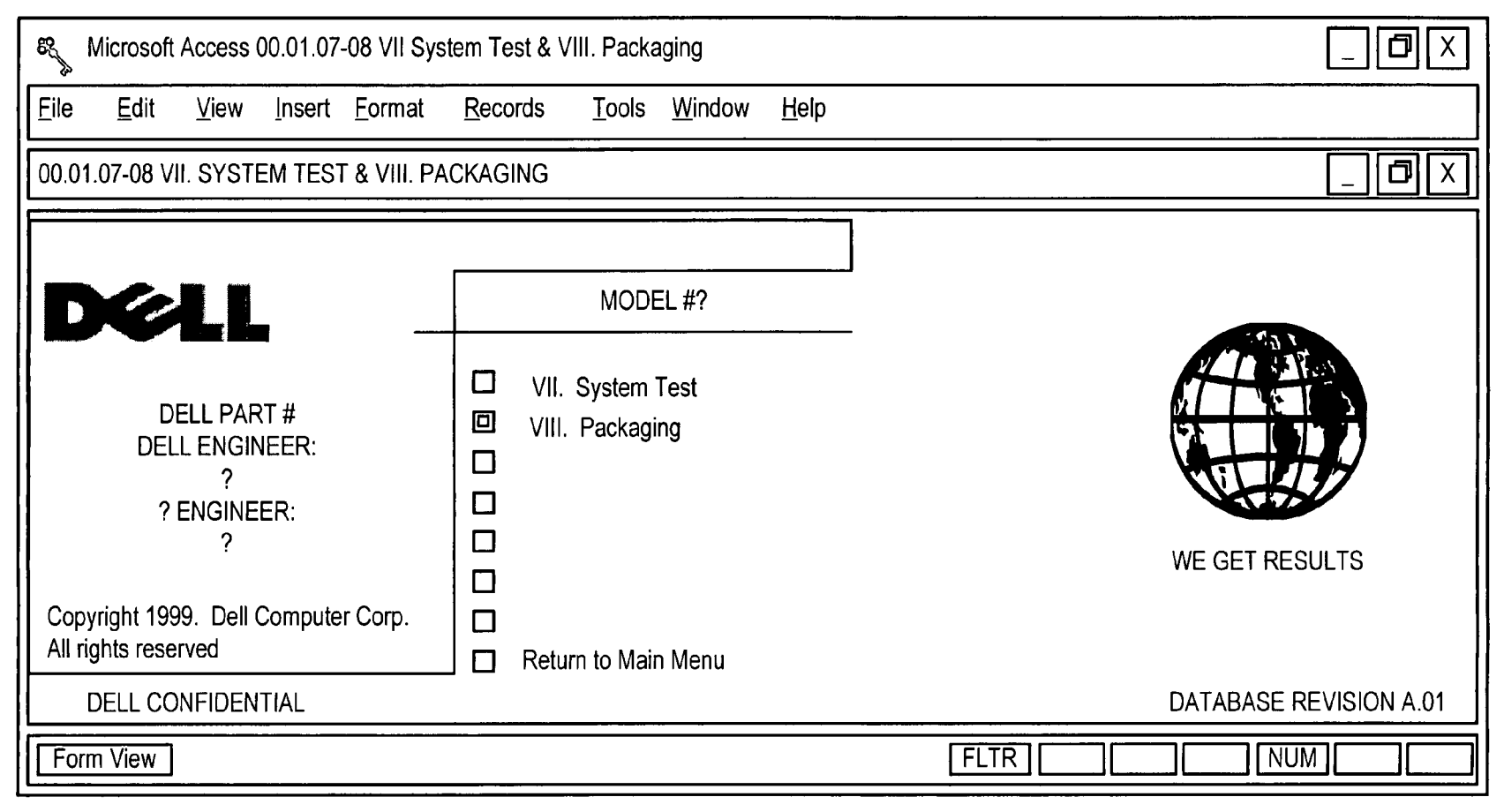
Figure 12B:
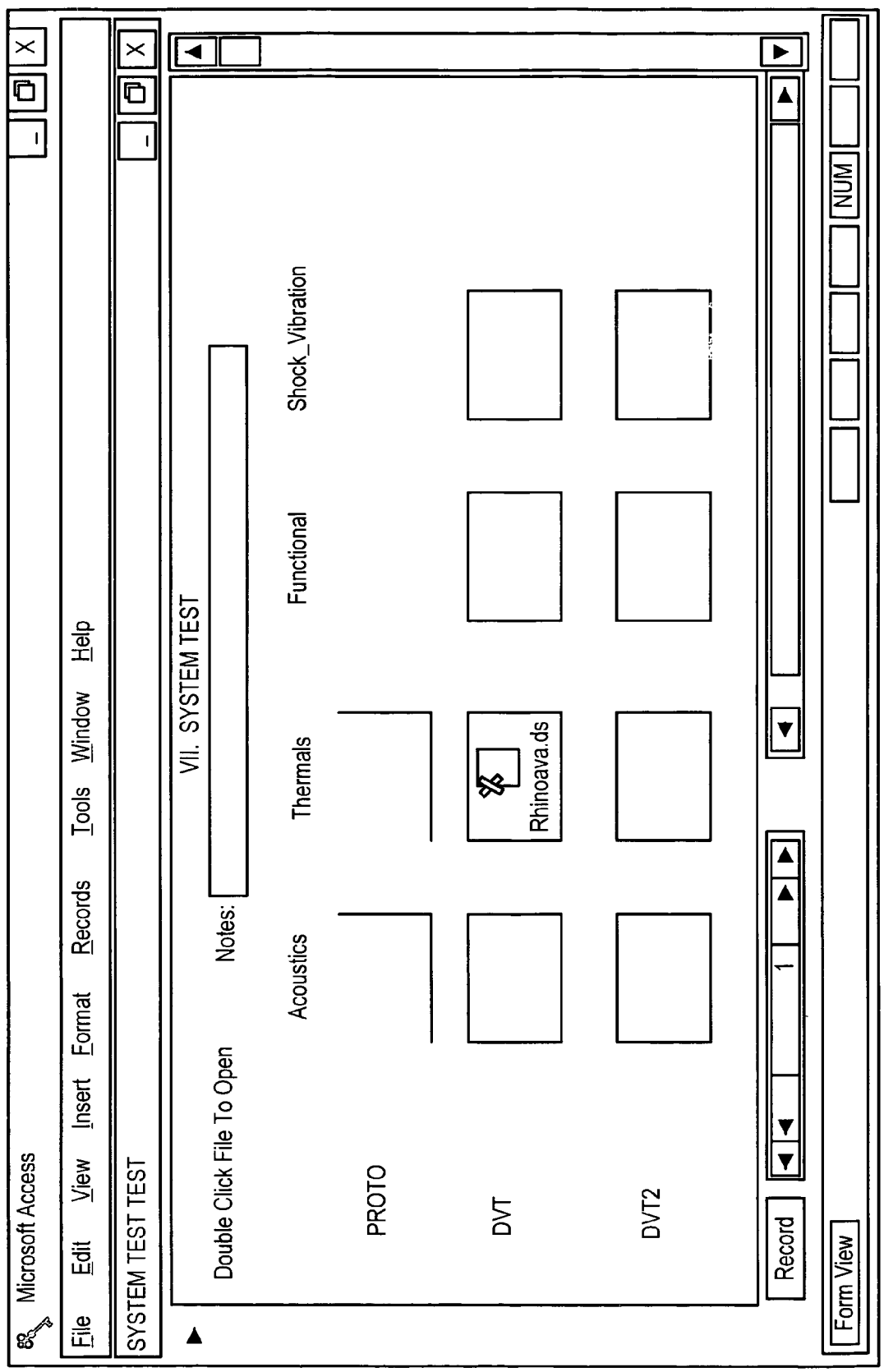
Figure 13A:
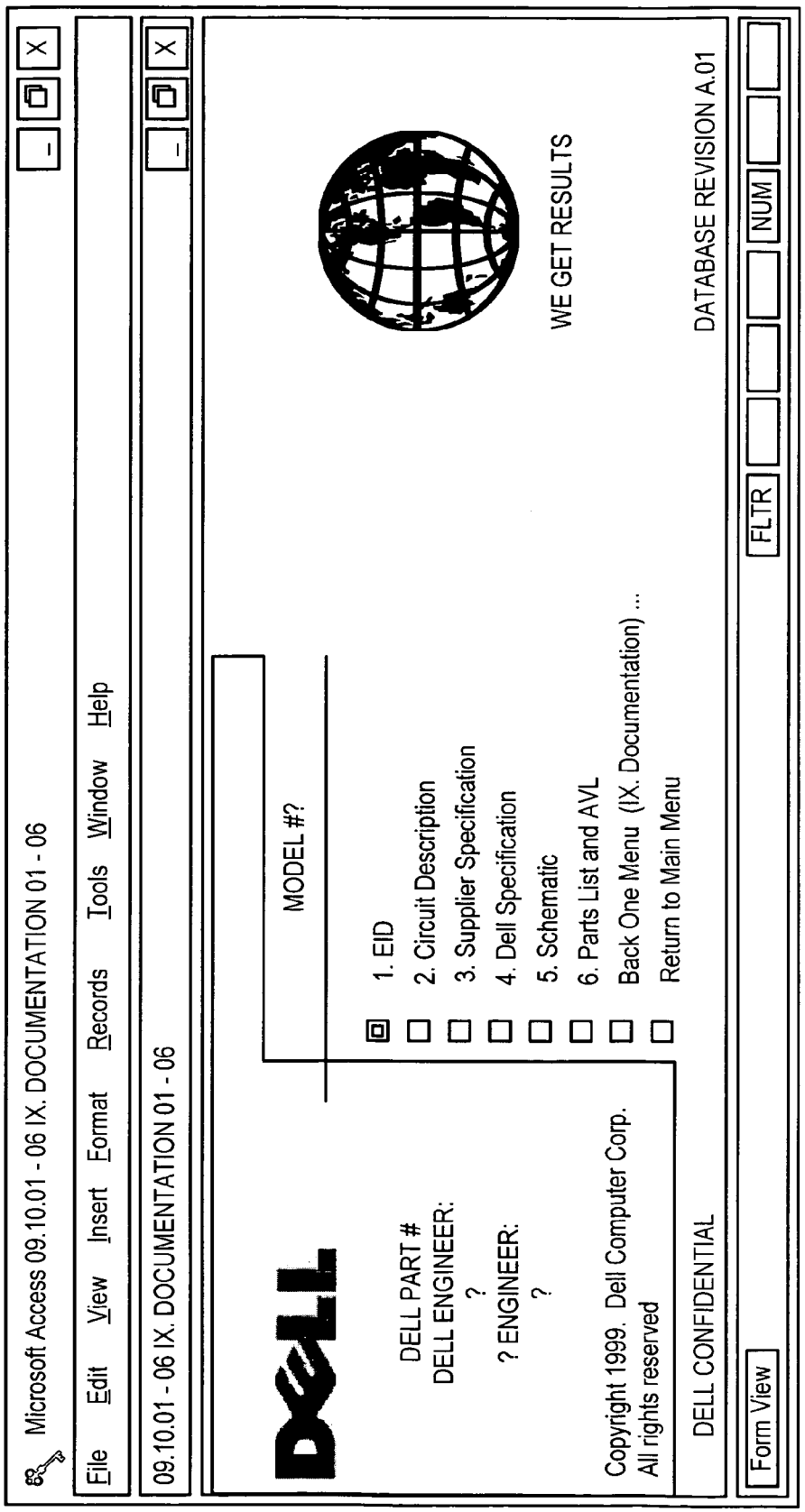
FIGS. 13A & 13B are screen prints from a database showing a documentation form according to an embodiment of the present invention.
Figure 13B:
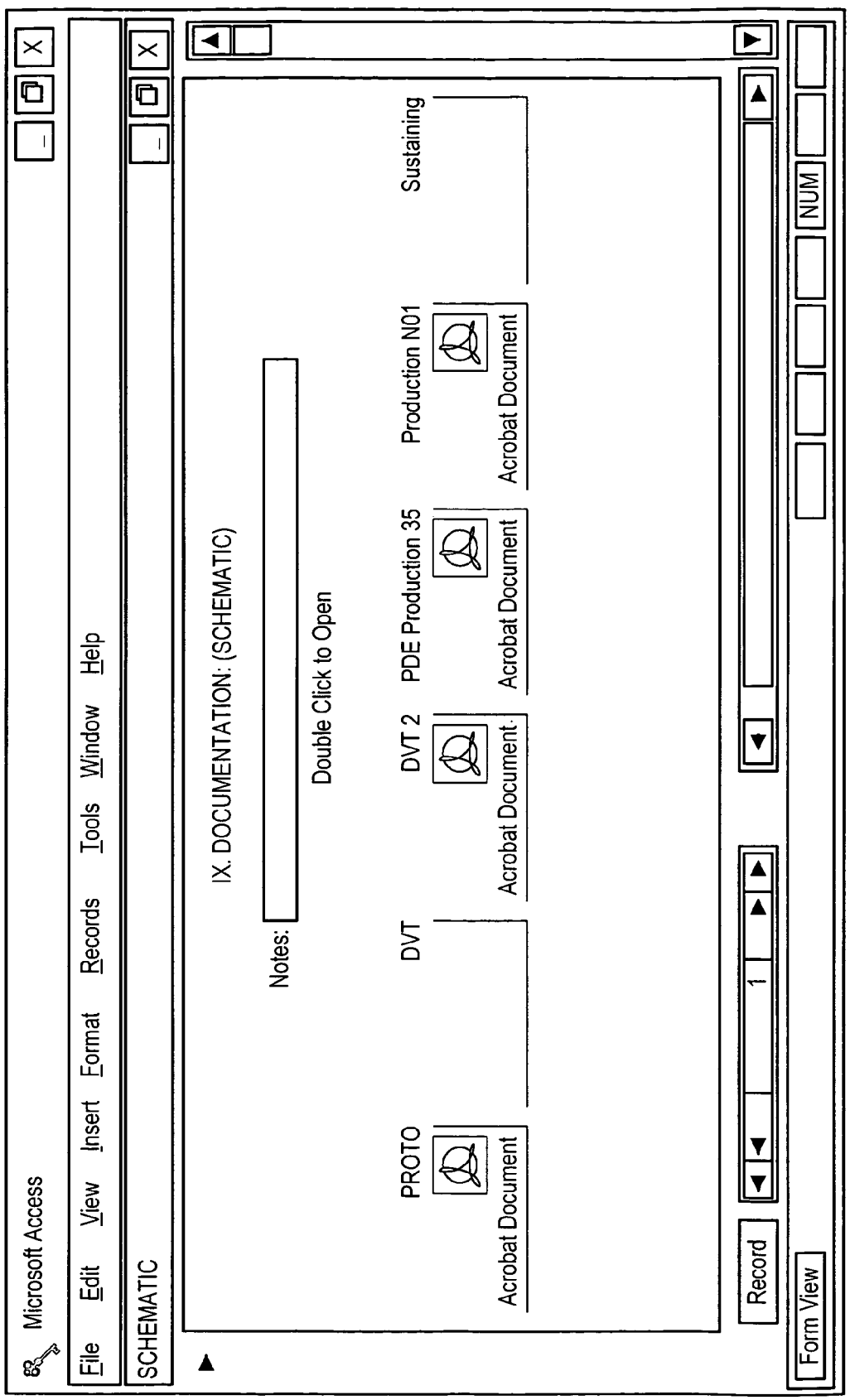

According to one embodiment, the database includes a plurality of partitions, each partition relating to a manufacturing stage for the component, with a plurality of fields within each partition, the plurality of fields for logging information related to the different manufacturing development stages. More specifically, as shown in FIGS. 4–13 different pages from a database show a plurality of fields including a plurality of forms for inputting data from outside suppliers and manufacturer of test results and documentation. For example, FIG. 5 relates to results from automatic test equipment the data from test results is accessible through the database. FIG. 6 relates to bench test reports that are accessible through the database. The bench test reports can be both input to the database or edited. FIG. 7 relates to a mechanical form for inputting and editing mechanical part data. FIG. 8 relates to a final design review form for inputting edits's data relations to electrical, mechanical packaging and tooling data. FIG. 9 relates to a manufacturability form for inputting & editing data relating to supplier review, manufacturer review and tooling plans and changes to tooling plans. FIG. 10 relates to a safety form including governmental safety reports and certificates. FIG. 11 relates to a reliability test results form including data for test results and reports. The data can be input by either suppliers or the manufacturer. FIG. 12 relates to a system test form for inputting and editing system test results. For example, system test results may include acoustic testing, thermal testing, functionality testing and shock/vibration testing. FIG. 13 relates to a documentation form. For example, either a supplier or the manufacturer can input or edit schematics, specifications and other types of developmental documentation in the documentation form.

Figure 4A:
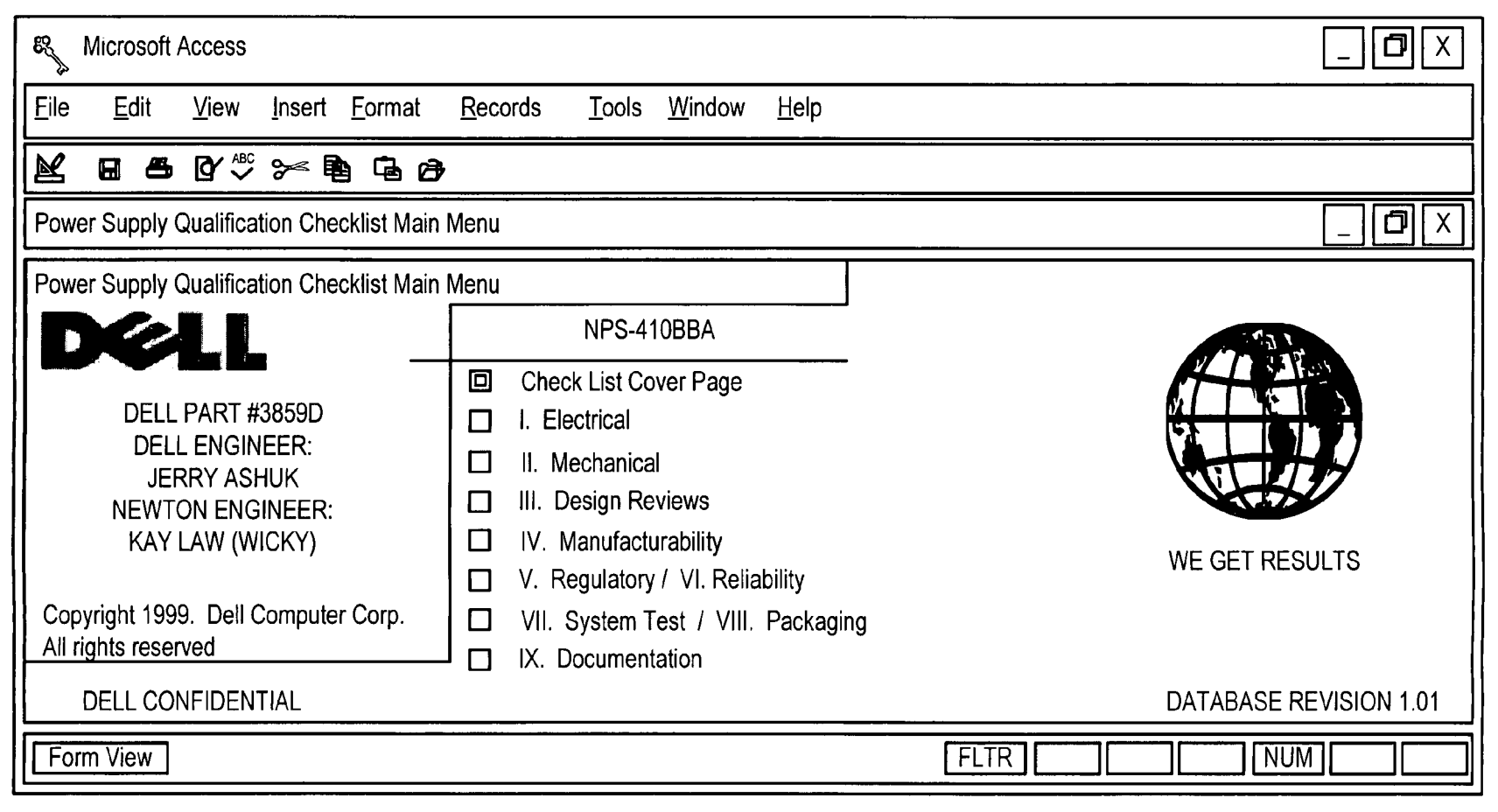

Referring to FIG. 4B, according to an embodiment, the database includes a checklist 410 identifying different manufacturing areas that require documentation I to IX. The fields 410 allow either the manufacturer or a supplier to input data relating to each stage. The plurality of fields 420 in the checklist relate to the different manufacturing stages: the prototype stage; development stage; secondary stage; and production release stage. Alternaternatively, the database includes a sustaining stage (not shown) for including documentation after the component has gone to production. The particular form identified in FIG. 4B relates to a power supply qualification checklist and provides fields for identifying an outside supplier and model 430, a Dell Computer Corporation part number, 440 a field for providing the Dell engineer 450 and a field for providing the supplier engineer 460.

FIGS. 4–13 demonstrate a database that provides a plurality storage locations for storing data related to the plurality of pages. Each page is a partition of the database that can be completed by different relevant parties. Accordingly, the database is accessible to a manufacturer and at least one outside supplier or internal supplier. In one embodiment, the database is accessible via an internet/intranet connection to a network. In this embodiment, a manufacturer controlling the database may provide different security levels for access to the database. For example, a particular password may be relevant to each partition. Other security measures include providing the database to parties on a read only basis while others may have read and write capabilities.

According to another embodiment, the database is accessible via the memory being transportable. For example, the database may be located on a compact disc in either read only or read and write format. The compact disc is capable of being transported to a supplier that inputs data. Once the data is complete, the supplier returns the compact disc to the manufacturer for review and further testing in an iterative manner.

According to an embodiment of the database, pointers within the database locate where further data related to component procurement is located. The data may include tests, schematics, mechanical and electrical drawing, tables and other information. In order for a plurality of parties to view the data, the database optionally provides pointers to the location of a plurality of viewers. Such viewers include those that are widely available free of charge. The viewers enable the manufacturer and suppliers to view identical data. As viewers, the data is available on a read-only basis.

Those of skill in the art will recognize that, based upon the teachings herein, several modifications may be made to the embodiments shown in FIGS. 1–13. For example, the Figures relate to a database that one of ordinary skill in the art can modify using the disclosure herein described to other situations in which a number of relevant parties are required to share documentation.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for procuring a manufactured component through a plurality of development stages, the method comprising:
   providing a database for storing information related to procuring the manufactured component;
   sharing the database among a plurality of relevant parties, at least one of the relevant parties comprising an outside vendor;
   inputting data into the database by at least one of the relevant parties during a development stage of the manufactured component; and
   modifying the database at each development stage of the manufactured component if necessary.

2. The method of claim 1 wherein the database holds data related to procurement of a plurality of components for a computer system.

3. The method of claim 1 further comprising:
   providing a pointer in the database, the pointer locating data related to at least one of the development stages of the manufactured component.

4. The method of claim 1 wherein the relevant parties include a manufacturer and at least one supplier.

5. The method of claim 1 wherein the data includes:
   production information;
   testing information;
   regulatory information; and
   cost information.

6. The method of claim 1 wherein the database is stored on a memory and includes:
   a plurality of partitions, each partition relating to manufacturing the component;
   a plurality of fields within each partition, the plurality of fields for logging information related to a plurality of manufacturing development stages; and
   a plurality of storage locations for storing data related to the plurality of partitions;
   wherein the database is accessible to a manufacturer and said outside vendor.

7. The method of claim 1 wherein the database is accessible via one of an internet connection to a network, an intranet connection to a network and both an internet and intranet connection to a network.

8. The method of claim 1 wherein the database is accessible via a transportable memory.

9. A database stored on a memory for use in manufacturing a component, the database comprising:
   a plurality of partitions, each partition relating to manufacturing the component;
   a plurality of fields within each partition, the plurality of fields for logging information related to a plurality of manufacturing development stages; and
   a plurality of storage locations for storing data related to the plurality of partitions;
   wherein the database is accessible to a manufacturer and at least one outside vendor.

10. The database of claim 9 wherein the database is accessible via one of an internet connection to a network, an intranet connection to a network, and both an internet and intranet connection to a network.

11. The database of claim 9 wherein the database is accessible via the memory being transportable.

12. The database of claim 9 wherein the database is capable of activating a plurality of programs for viewing and editing the data, the plurality of programs enabling the manufacturer and the at least one outside vendor to view and edit identical data.

13. The database of claim 12 wherein the plurality of programs are read-only viewers.

14. The database of claim 9 wherein the plurality of fields includes a plurality of comment fields.

15. The computer system of claim 9 wherein the plurality of partitions includes a plurality of forms for inputting and viewing data.

16. The database of claim 15 wherein the plurality of forms include at least one of an evaluation form, a regulatory form, a reliability form, a design review form, a manufacturability form, a documentation form, a system test form, a mechanical form, a bench test form and a report form.

17. A method of procuring a computer component comprising:
   providing a database stored on a memory, the database including:
   a plurality of partitions, each partition relating to manufacturing the component;
   a plurality of fields within each partition, the plurality of fields for logging information related to a plurality of manufacturing development stages; and
   a plurality of storage locations for storing data related to the plurality of partitions, and providing access to the database by a manufacturer and at least one outside vendor.

18. The method of claim 17 wherein the database is accessible via one of an internet connection to a network, an intranet connection to a network, and both an internet and intranet connection to a network.

19. The method of claim 17 wherein the database is contained in a transportable memory.

20. The method of claim 17 further comprising:
enabling the manufacturer and the at least one outside vendor to view identical data via a plurality of programs for viewing and editing the data.

21. The method of claim 20 wherein the plurality of programs are read-only viewers.

22. The method of claim 17 wherein the plurality of fields includes a plurality of comment fields.

23. The method of claim 17 wherein the plurality of partitions includes a plurality of forms for inputting and viewing data.

24. The method of claim 23 wherein the plurality of forms include at least one of an evaluation form, a regulatory form, a reliability form, a design review form, a manufacturability form, a documentation form, a system test form, a mechanical form, a bench test form and a report form.

25. The method of claim 17 wherein the plurality of partitions includes:
a second subset of the plurality of fields for inputting data related to test results.

26. A computer system comprising:
a processor;
system memory coupled to the processor;
a memory coupled to the processor, the memory including a database for use in manufacturing a component, the database including:
a plurality of partitions, each partition relating to manufacturing the component;
a plurality of fields within each partition, the plurality of fields for logging information related to a plurality of manufacturing development stages; and
a plurality of storage locations for storing data related to the plurality of partitions;
wherein the database is accessible to a manufacturer and at least one outside vendor.

27. The computer system of claim 26 wherein the database is accessible via a computer network.

28. The computer system of claim 26 wherein the database is accessible via the memory being transportable.

29. The computer system of claim 26 wherein the database includes a plurality of programs for editing and viewing the data, the plurality of programs enabling the manufacturer and the at least one outside vendor to view identical data.

30. The computer system of claim 26 wherein the plurality of viewers are read-only viewers.

31. The computer system of claim 26 wherein the plurality of fields includes a plurality of comment fields.

32. The computer system of claim 26 wherein the plurality of partitions includes a plurality of forms for inputting and viewing data.

33. The computer system of claim 32 wherein the plurality of forms include at least one of an evaluation form, a regulatory form, a reliability form, a design review form, a manufacturability form, a documentation form, a system test form, a mechanical form, a bench test form and a report form.

34. The method of claim 17, further comprising limiting access of said at least one outside vendor to at least a portion of said database.

35. The method of claim 17, further comprising providing a plurality of security levels to limit access to said database.

36. The method of claim 17, wherein said at least one vendor provides technical documentation to said database.

* * * * *